US009807620B2

(12) United States Patent
Zou et al.

(10) Patent No.: US 9,807,620 B2

(45) Date of Patent: Oct. 31, 2017

(54) METHOD AND APPARATUS FOR INTERFERENCE MANAGEMENT IN HETEROGENOUS NETWORKS

(75) Inventors: Jialin Zou, Randolph, NJ (US); Subramanian Vasudevan, Morristown, NJ (US); Kathiravetpillai Sivanesan, Richardson, TX (US)

(73) Assignee: Alcatel Lucent, Boulogne-Billancourt (FR)

( * ) Notice: Subject to any disclaimer, the term of this patent is extended or adjusted under 35 U.S.C. 154(b) by 559 days.

(21) Appl. No.: 12/838,949

(22) Filed: Jul. 19, 2010

(65) Prior Publication Data

US 2012/0014360 A1 Jan. 19, 2012

(51) Int. Cl.

*H04W 4/00* (2009.01)
*H04W 16/16* (2009.01)
*H04W 84/04* (2009.01)

(52) U.S. Cl.

CPC .......... *H04W 16/16* (2013.01); *H04W 84/045* (2013.01); *Y02B 60/50* (2013.01)

(58) Field of Classification Search

CPC ..... H04W 16/16; H04W 84/045; Y02B 60/50
(Continued)

(56) References Cited

U.S. PATENT DOCUMENTS 5,914,947 A * 6/1999 Saito .................... H04B 7/2628 370/320
2003/0021257 A1* 1/2003 Sato .................... H04W 72/121 370/347

(Continued)

FOREIGN PATENT DOCUMENTS

| | | | |
|---|---|---|---|
| EP | 2101541 | A1 | 9/2009 |
| WO | 2009117812 | A1 | 10/2009 |
| WO | 2011/042325 | | 9/2011 |

OTHER PUBLICATIONS

Mitsubishi Electric: "CoMP in heterogeneous network deployment", 3GPP Draft; R3-092539 (COMP_FOR_HETNET), 3rd Generation Partnership Project (3GPP), Mobile Competence Centre; 650 Route Des Lucioles; F-06921 Sophia-Antipolis Cedex; France, No. Miyazaki; Oct. 12, 2009, Oct. 12, 2009 (Oct. 12, 2009), XP050392036, [retrieved on Oct. 3, 2009] paragraph 2, at p. 1, lines 1-2 p. 2, lines 4-5 figure 1.

(Continued)

*Primary Examiner* — Luat Phung
(74) *Attorney, Agent, or Firm* — Chiesa Shahinian & Giantomasi, PC

(57) ABSTRACT

A method is provided a wireless system for providing small "guard" cells in a heterogeneous network at locations proximate to privately-maintained HeNB (or femto) cells in the heterogeneous network. More particularly, the methodology of the invention addresses the problem of a mobile user in a heterogeneous network located nearby to a privately maintained HeNB cell in the heterogeneous network, and the inherent interference created for the HeNB cell by the necessity of the mobile user having to transmit and receive communications from a distant public macro eNB. By deploying small public "guard" cells in the macro cell proximate to the private HeNB cells, such a public mobile terminal is enabled to communicate with the public small cell at generally lower power than would have been necessary for communication with the distant macro eNB, with a resulting reduction in interference for the nearby HeNB cell. The FL interference between the macro cell and the HeNBs is also mitigated.

20 Claims, 2 Drawing Sheets

(58) Field of Classification Search
USPC .......................... 370/328, 329, 338; 455/450
See application file for complete search history.

(56) References Cited

U.S. PATENT DOCUMENTS

| | | | | |
|---|---|---|---|---|
| 2005/0025093 | A1* | 2/2005 | Yun | H04W 76/02 370/328 |
| 2008/0268851 | A1 | 10/2008 | Tinnakornsrisuphap et al. | |
| 2009/0092081 | A1* | 4/2009 | Balasubramanian et al. | 370/328 |
| 2009/0238117 | A1* | 9/2009 | Somasundaram et al. | 370/328 |
| 2010/0008282 | A1 | 1/2010 | Bhattad | |
| 2010/0056177 | A1* | 3/2010 | Kojima | 455/456.1 |
| 2010/0151894 | A1 | 6/2010 | Oh | |
| 2011/0128916 | A1* | 6/2011 | Kwon et al. | 370/328 |
| 2011/0171949 | A1* | 7/2011 | Liao et al. | 455/422.1 |
| 2011/0294493 | A1* | 12/2011 | Nagaraja et al. | 455/422.1 |
| 2012/0213189 | A1* | 8/2012 | Choi et al. | 370/329 |

OTHER PUBLICATIONS

Qualcomm Incorporated: "Extending Rel-8/9 ICIC into Rel-10", 3GPP Draft; R1-101505 Extending REL-8-9 ICIC Into REL-10, 3rd Generation Partnership Project (3GPP), Mobile Competence Centre; 650, Route Des Lucioles; F-06921 Sophia-Antipolis Cedex; France, vol. RAN WG1, No. San Francisco, USA; Feb. 22, 2010, Feb. 16, 2010 (Feb. 16, 2010), XP050418951, [retrieved on Feb. 16, 2010] paragraph 2.3, line 1 figure 3.

Huawei: "Evaluation for Open and hybrid access mode H(e)NB support", 3GPP Draft; S2-094047 WAS 3327, 3rd Generation Partnership Project (3GPP), Mobile Competence Centre; 650, Route Des Lucioles; F-06921 Sophia-Antipolis Cedex; France, No. Tallinn; May 13, 2009, May 13, 2009 (May 13, 2009), XP050347028, [retrieved on May 13, 2009] p. 1, line 2-line 3 p. 1, line 16.

Chttl et al: "Views on heterogeneous deployment scenarios with distributed RRHs", 3GPP Draft; R1-111006, 3rd Generation Partnership Project (3GPP), Mobile Competence Centre; 650, Route Des Lucioles; F-06921 Sophia-Antipolis Cedex; France, vol. RAN WG1, No. Taipei, Taiwan; Feb. 21, 2011, Feb. 17, 2011 (Feb. 17, 2011), XP050490799, [retrieved on Feb. 17, 2011] paragraph 1, paragrah 2, p. 1, lines 1-3, 7, 12, paragraph 2, p. 2, lines 3-4 figure 1.

Notice of Reason for Refusal issued on Jan. 28, 2014, for corresponding JP patent application No. 2013-520725, 6 pp.

* cited by examiner

METHOD AND APPARATUS FOR INTERFERENCE MANAGEMENT IN HETEROGENOUS NETWORKS

FIELD OF THE INVENTION

The present invention generally relates to managing interference in a wireless communications system.

BACKGROUND OF THE INVENTION

In wireless communications systems of the art, a variety of transmission protocols have been developed for providing airlink service to users. Exemplary network services based on such transmission protocols include High Rate Packet Data (HRPD), Long Term Evolution (LTE) and Universal Mobile Telecommunications System (UMTS). Each of these network services is defined in terms of a particular Radio Access Technology (RAT), and, in general, the RAT defining each different transmission protocol requires a unique RF configuration for transmission and reception of communications based on a given RAT.

Heterogeneous networks (HetNets) are now being developed wherein cells of smaller size are embedded within the coverage area of larger macro cells, primarily to provide increased capacity in targeted areas of data traffic concentration. Such heterogeneous networks try to exploit the spatial variations in user (and traffic) distribution to efficiently increase the overall capacity of the wireless network.

Based on the cell size, Heterogeneous networks are generally classified according to two major types: Large cells, which include macro cells and macro relays; and Small cells, which include micro cells, pico cells, Home evolved node B (HeNB)/femto cells (usually privately maintained) and small relays. It is a common deployment scenario that macro coverage is overlapped with spotty small cell coverage. Transmission power differences for mobile stations, or User Equipments (UEs) communicating with macro cells and overlapped small cells create significant interference management problems in those HetNets.

In the case of the small cells (pico/femto/HeNB) being located at the edge area of a macro cell, the small cell will experience severe Reverse Link (RL) interference from a nearby UE transmitting (RL) to the macro cell. Similarly, Forward Link (FL) interference from the small cell to the macro cell may be experienced when the small cell is at the edge of the macro cell since the location is far away from the macro eNB and its FL signal is very weak. A characteristic of the HeNB small cells is that access to such cells is normally only open to an authorized small group of UEs. Thus, for a non-authorized UE, no matter how close it is to an HeNB cell, it is unable to handover to the HeNB cell, and accordingly, must continue to maintain communications with the macro cell. When the UE is located sufficiently close to the HeNB that it could handoff to that cell but for the lack of authorization, but located somewhat distantly from the eNB of the macro cell, this will lead to even more severe interference between macro and femto/HeNB cells. Additionally, many of the legacy UEs cannot be re-configured to access an HeNB cell, even if authorization for such access to a given eNB cell were otherwise desired. It is also noted that there are already a large among HeNB cells being deployed within macro cells and the density of such deployments is expected to sharply increase in the future.

SUMMARY OF INVENTION

A method is provided a wireless system for providing small "guard" cells in a heterogeneous network at locations proximate to privately-maintained HeNB cells in the heterogeneous network. More particularly, the methodology of the invention addresses the problem of a mobile user in a heterogeneous network located nearby to a privately owned and maintained HeNB cell in the heterogeneous network, and the inherent interference created for the HeNB cell by the necessity of the mobile user having to transmit and receive communications from a distant public macro eNB. By deploying small public "guard" cells in the macro cell proximate to the private HeNB cells, such a public mobile terminal is enabled to communicate with the public small cell at generally much lower power than would have been necessary for communication with the distant macro eNB, with a resulting reduction in interference for the nearby HeNB cell. In an alternate embodiment, the invention methodology addresses alternate communication pathways from the mobile terminal to either the small public cell or the macro eNB.

BRIEF DESCRIPTION OF THE FIGURES

The teachings of the present invention can be readily understood by considering the following detailed description in conjunction with the accompanying drawings, in which.

DETAILED DESCRIPTION

Figure 1:
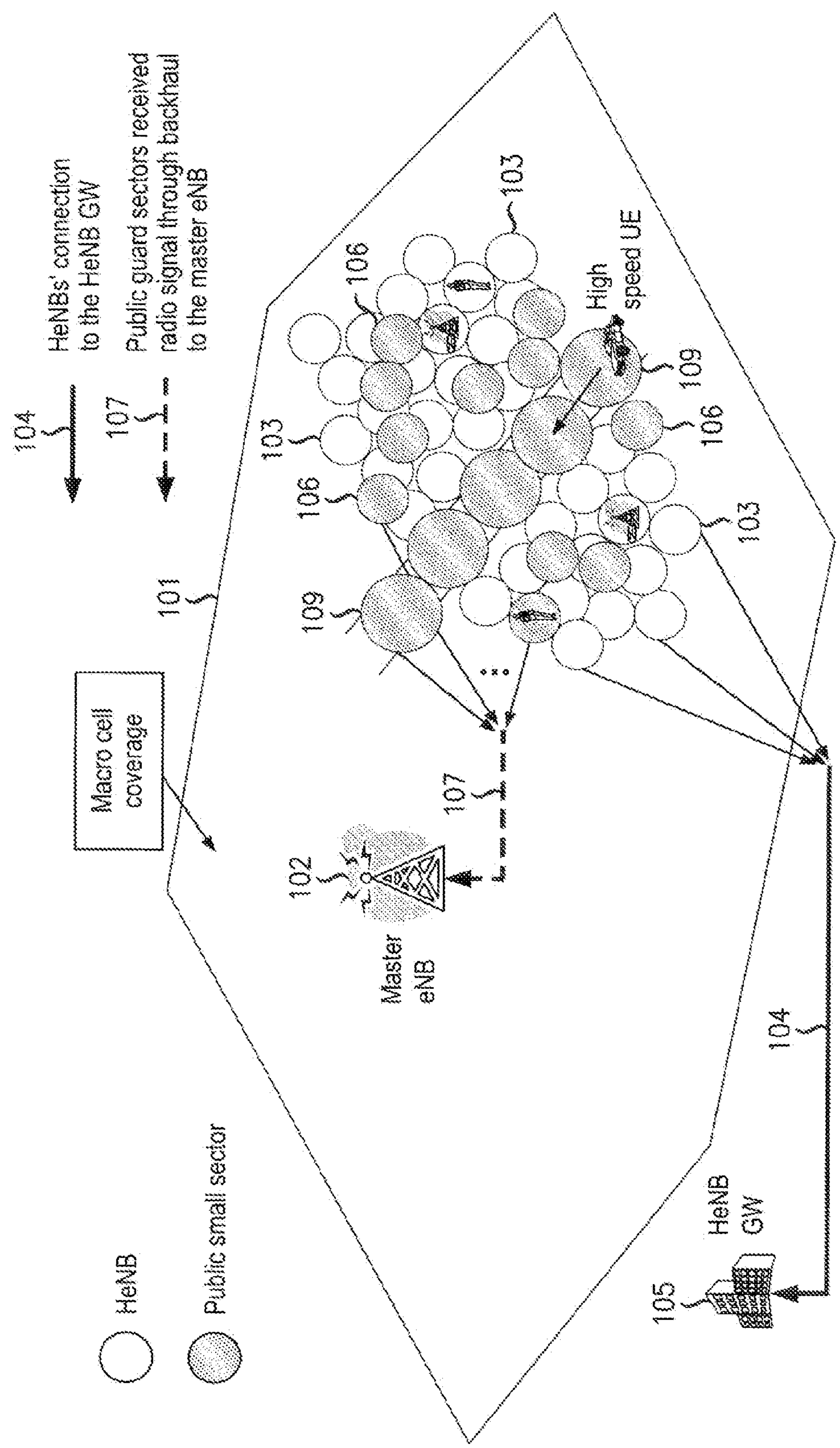
FIG. 1 provides a schematic depiction of a wireless system arrangement in which the method of the invention may be implemented.

In the following description, for purposes of explanation and not limitation, specific details are set forth such as particular architectures, interfaces, techniques, etc., in order to provide a thorough understanding of illustrative embodiments of the invention. However, it will be apparent to those skilled in the art that the invention may be practiced in other illustrative embodiments that depart from these specific details. In some instances, detailed descriptions of well-known devices, circuits, and methods are omitted so as not to obscure the description of described embodiments with unnecessary detail. All principles, aspects, and embodiments, as well as specific examples thereof, are intended to encompass both structural and functional equivalents thereof. Additionally, it is intended that such equivalents include both currently known equivalents as well as equivalents developed in the future.

The invention is described hereafter in terms of power transmission interactions among macro cells and small cells (including both HeNbs and public small cells) in a heterogeneous network to achieve reduced overall interference in the HetNet. While the disclosed invention methodology is described for an exemplary case of a heterogeneous network having at least one macro cell and one or more small cells embedded within the macro cell, the one or more small cells including at least one HeNB cell, the invention methodology is applicable generally to interference management in any HetNet comprising a macro cell and one of more small cells, whether publically accessible or not, and the claimed invention is intended to cover all such applications of that methodology. It is also noted that the invention is illustratively described in terms of a wireless system proving service according to the LTE standards, but it should be readily apparent that the inventive concept is applicable to other wireless configuration wherein a macro cell also encompasses one or more small cells operating therewithin.

In heterogeneous networks, it is a very common deployment scenario that macro coverage is overlaid with spotty HeNB (femto) cell coverage for residential areas and office complexes. In most cases, such HeNB cells are privately owned (being commonly operated inside residences or office buildings to improve in-building wireless coverage) and only those UEs authorized by the HeNB owner are able to communicably link to that HeNB. It is often the case that a non-authorized UE in communication with a macro cell of the HetNet is nearby an included HeNB. Since the UE is not authorized for access to the HeNB, it has to communicate with the macro cell, with the result that its higher uplink transmission power required to communicate with a more distant macro cell generates considerable interference for the nearby HeNB. This reverse link interference from the non-authorized UE will be particularly acute when the UE and neighboring HeNB are located at or near the cell edge of the macro cell.

While techniques are generally known for Inter-Cell Interference Coordination (ICIC) among neighboring macro cells, it is difficult to conduct per-UE network controlled ICIC between the macro cell and the HeNBs since the HeNBs have a much looser connection with the macro cells of the public cellular systems. The communication path between the HeNB cell and the wireless Core Network uses an internet connection to an HeNB Gateway (HeNB-GW) which interfaces with the Core Network, while the communication path between the public macro eNB cell traverses a dedicated bearer circuit, known as an S1 connection in LTE, to a Serving Gateway (S-GW) which interfaces the Core Network. Thus the only common point of communication between the HeNB and the public macro eNB is at the Core Network level, which would introduce considerable latency into any effort to mange interference between the macro eNB and the HeNB. In addition, as noted above, the HeNB is normally privately owned and cost sensitive. As such, the HeNB is not suitable for excessive control by the public cellular system operators and it is not feasible to include the complicated mechanisms to support such controls.

The lack of a viable approach for interference coordination among a macro cell and one or more included privately-owned HeNB cells inherently leads to higher levels of interference within the cell. A particularly problematic instance of such interference occurs in the case of a mobile terminal, or user equipment (UE) being geographically proximate to an HeNB at which the UE has no access privilege. In that case, the UE, being constrained to only communicate with the macro cell base station, is likely to transmit on the uplink at much higher power than would be warranted if transmitting to the HeNB, and thus will substantially increase the interference level at the HeNB.

To address the inter-cell interference problem described above the inventors have developed a wireless system architecture in which one or more publically-accessible small cells will be dispersed in a macro cell to be geographically proximate to HeNB cells located within the macro cell. Characterized by the inventors as "guard" cells, the small public cells public small/pico cells will be deployed in the HeNB with transmission power level similar to that of the "guarded" HeNB cells, and can be expected to substantially ameliorate the inter-cell interference problems occurring with HetNet configurations of the art. The invention concept is illustrated in FIG. 1 and will be further described hereafter in conjunction with that figure.

FIG. 1 depicts a macro cell 101 (stylistically depicted as having a hexagonal contour) served by a macro eNB 102. Operating within the macro cell 101 are a plurality of HeNB cells 103, depicted as having a circular contour, and with no shading. Illustrative ones of the HeNB cells are shown as being connected via link 104 (generally corresponding to an internet connection) to HeNb Gateway 105. As explained above, the HeNB Gateway interfaces the wireless system at the Core Network level (not shown in figure).

According to the invention, and further depicted in FIG. 1, one or more small public cells 106 having transmission power levels similar to that of the HeNB cells are deployed within the macro cell at locations generally nearby to locations of HeNB cells. The small public cells, which are depicted in the figure as having circular contour and with light shading, may be operated either independently of the serving eNB, and connected to the eNB via connection 107, using an X2 interface, or may be operated as a remote radio head (i.e., distributed sector) of the serving eNB, connected to the eNB, again via connection 107, using an S1 interface. The public small cell may be identified by having a small cell indication associated with all the IDs of the small cells in the neighbor information block broadcast by the overlaid macro cell. As will be discussed below, operation of the small public cell as a remote radio head from the serving eNB is generally preferred, and the embodiments described herein will be based on that configuration unless the alternate configuration is affirmatively specified.

Further depicted in FIG. 1 is a roadway 108 traversing a path through the illustrated cluster of HeNB cells and intermixed public small cells. For this case, which may or may not occur in a particular macro cell configured according to the invention, it may be desirable to implement "guard" public cells of somewhat greater size 109, and transmission power, than, for example, an office complex where small "guard" cells are deployed proximate HeNB cells in the same office complex (and movement among cells likely to be much slower than on a roadway). With such a deployment of moderately larger "guard" cells for a roadway, very frequent handovers from cell to cell, which introduces its own set of issues, will be diminished or possibly avoided altogether. Accordingly, optimization of the size of the small public guard cells along such a roadway will involve a tradeoff between frequency of expected handoffs and possible macro/small inter-cell interference.

As will probably be apparent from the invention concept, as well as from the configuration depicted in FIG. 1, a preferred application of the public "guard" cells of the invention is within a cluster of HeNB cells (as might occur in an office complex) where a relative small number of the public small cells can provide an effective "guard" against inter-cell interference for a relatively larger number of HeNB cells. However, it should also be understood that the invention concept is equally applicable to the case of a public small cell being deployed to "guard" a small number of HeNB cells, or even a single HeNB cell. Operational considerations may render the latter case unlikely to occur, but the inventive concept is still applicable. It is also useful to note here that the specific configuration of HeNB cells, small public cells and somewhat larger public cells (for the roadway) depicted in FIG. 1 is solely for illustrating the principles of the invention, and accordingly should not be viewed as in any way limiting the scope of the invention to other configurations of heterogeneous networks in which the invention principles may be applied.

To summarize the basic concept for the invention, the "guard" small/pico cells implemented according to the invention should be deployed nearby to HeNB cells located at an office, campus or residential area. Preferably, the "guard" cells will be deployed within the same facility in which the HeNB cells are operating, such as inside buildings in which multiple HeNB cells are deployed, but where that is not practical, "guard" cell deployment should be at a nearby public area, such as on utility poles along a street in a commercial area or a public pathway nearby. The "guard" small/pico cells will be open to public access with a transmission power level close or equivalent to the HeNB cells. In general, the coverage of the "guard" cells would be comparable to that of the HeNB cells, with the exception that "guard" cells deployed on or near a roadway may be somewhat larger to avoid unwarranted frequency of handoffs for a UE moving at relatively high speed on the roadway. Note that the size of the public "guard" cells should be maintained relatively close to the size of the "guarded" HeNB cells; otherwise deployment of such cells will defeat the goal of inter-cell interference reduction As noted above, it is preferred that the public "guard" cells be operated as distributed sectors of the serving eNB, using remote radio head protocols and technology. In this configuration, the serving eNB of the macro cell operates as a "master" for a connected array of "slave" remote small/pico sectors (the "guard" cells). With such a remote radio head arrangement, the serving macro eNB will perform the demodulation and decoding for all its remote small/pico sectors, signals will traverse a dedicated link between the serving macro eNB and the remote small/pico cell/sectors (typically implemented as fiber-optic cable) and signals will be transmitted over the connecting link at baseband, with up/down RF conversion being carried out at the individual small/pico cells.

In a further embodiment of the invention, the inventors address particular implementations of communication links between a UE and a nearby public "guard" cell and/or between the UE and the serving macro eNB. Note that for the case of the UE communicating with a nearby public "guard" cell on both the reverse link (RL) and the forward link (FL), while the RL interference is reduced (relative to the higher RL transmission power that would be required for the UE to transmit to the macro eNB), in the case that the location of the "guarded" HeNB cells and the associated public small cell(s) are far away from the host macro cell eNB, the guard cells may introduce higher FL interference to nearby HeNB cells. For this further embodiment of the invention, the FL and RL communication paths for a given UE are split, with the RL being connected to the public "guard" cell nearby to the UE's location and the FL being connected to the macro cell eNB. Thus the UE would receive communications from the wireless system via a forward link path from the macro eNB and would send communications to the wireless system via a reverse link connected to the nearby public "guard" cell.

As will be appreciated by those skilled in the art of wireless communication, the splitting of a UE's FL and RL into different cells may be difficult to implement due to the delay of the information exchange between the cells. However, with the preferred configuration of the small public "guard" cells of the invention using remote radio head (RRH) technology, this delay issue is substantially ameliorated. Since the "guard" cell RRH is just a sector of the host macro eNB, the cross sector operation (information exchange) delay is much less than that of the usual cross cell operations. Thus, application of RRH makes the separation of FL/RL to macro and small sectors entirely feasible.

Since increasing the transmission power at the macro FL (to serve a distant UE) will increase the interference over the entire macro cell coverage, there is trade-off on the guard cell FL interference versus the macro FL interference. Applying this tradeoff, the preferred case for splitting the UE FL to the macro eNB and its RL to the nearby public small cell should only be employed when the public small cell and the associated "guarded" HeNB cells are not close to the host macro eNB and there is no major small cell coverage nearby the host macro eNB. In addition, the FL interference of the HeNB to the macro cell FL should also be taken into consideration. If, in the area of macro cell edge, the FL HeNB to macro cell interference is a major concern, a UE should handoff both FL and RL to the guard cell.

Figure 2:
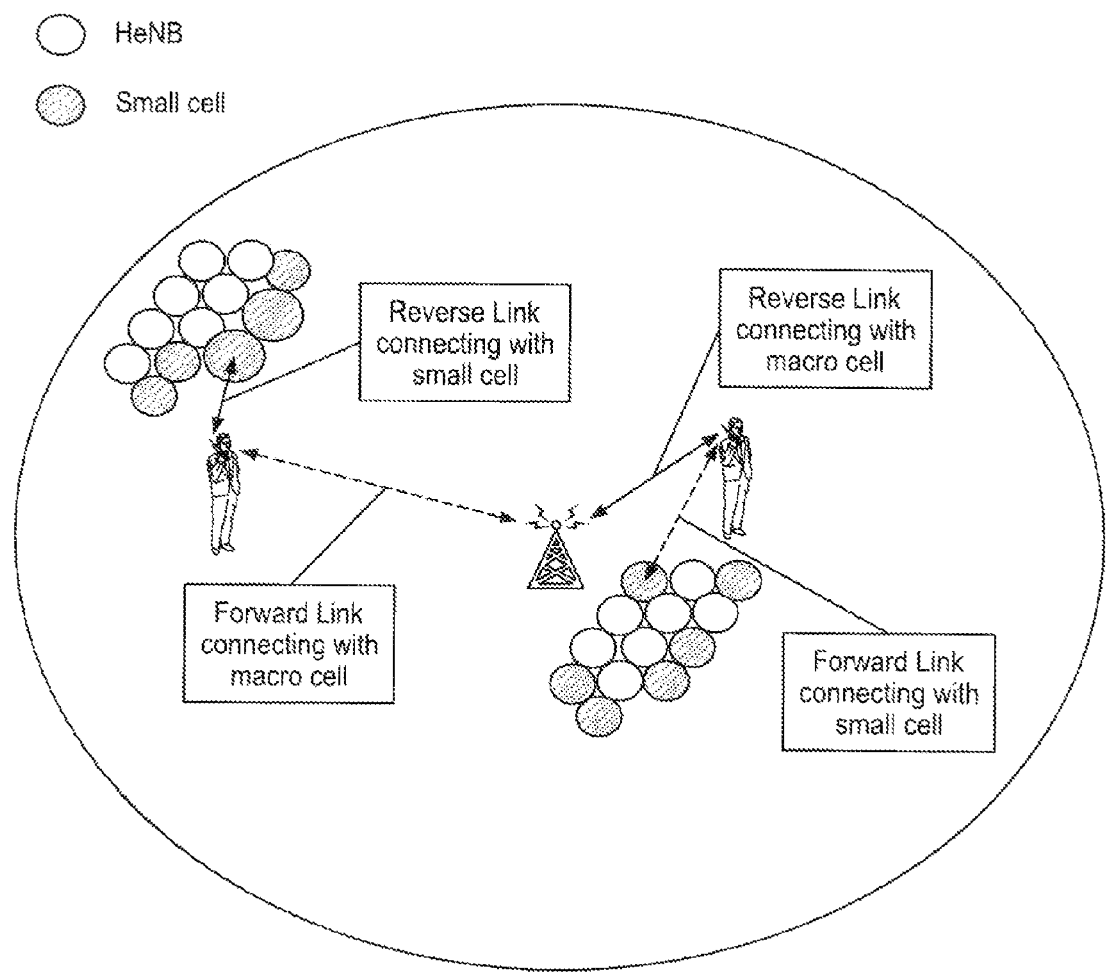
FIG. 2 provides a schematic depiction of an arrangement for communication paths established according to an embodiment of the invention

For the case of the public small cell and the associated "guarded" HeNB cell being close to the host macro eNB, the FL macro eNB to HeNB interference would be a major concern. Therefore, for this case, splitting of the FL and RL would be reversed from the case of the distant public small cell/HeNB cell. Thus, the FL would preferably connect the public small cell with the UE, while the UE's RL is connected to the macro eNB. The two cases of splitting the UE's FL and RL are schematically illustrated in FIG. 2, using the same conventions for identification of the small public cells and of the HeNB cells as applied for FIG. 1.

In the current art, when a UE powers up, it will follow the priority information provisioned in the UE to select a carrier or cell to camp onto. In addition, for HeNB cells, UE's are provisioned a white list of HeNB cells that are authorized for access by a given UE. A black list of HeNB cells that are not authorized for access by the given UE is also provisioned to the UE.

Similarly to the provisioning of the white list to the UE, the IDs of the public small cells may be provisioned into a UE, in a further embodiment of the invention. Such a provisioning of the small pubic cell IDs will help the UE to perform system selection with public small cells having the higher priority to camp on. Note that it is not necessary to list all the IDs of the small public cells in the public-cell white list. Rather, only one or a few group IDs, which represent group(s) of small cells, would be added to such a public-cell white list. For example, all of the small cells in the same area would have the same group ID. Individual small cell IDs can be constructed such that differences in ID number from cell to cell occur in the least significant bits of the ID number, with one or more of the most significant bits (MSBs) of the ID numbers being common to all cells in the group. Thus the small cell group ID could simply be the MSBs common to all the cells in the group.

With the provisioning of the public small cell white list to the UEs, priority carrier selection on power-up of a UE located in an area of coverage overlap between the macro cell on one or more public small cells will be carried out as follows. The group ID(s) of the small cells being provisioned in the UEs, a UE can identify a small cell based on the MSBs (small cell group ID) of the small cell's ID. When the UE is powered up at a location within a region of overlapped coverage between the macro eNB and one of the small public "guard" cells, the small public cell will be set to the higher priority over that of the macro cell for UE system selection.

Herein, the inventors have disclosed a system and method for improved interference management in a heterogeneous network comprising a macro cell and one or more HeNB cells. Numerous modifications and alternative embodiments of the invention will be apparent to those skilled in the art in view of the foregoing description.

Accordingly, this description is to be construed as illustrative only and is for the purpose of teaching those skilled in the art the best mode of carrying out the invention and is not intended to illustrate all possible forms thereof. It is also understood that the words used are words of description, rather that limitation, and that details of the structure may be varied substantially without departing from the spirit of the invention, and that the exclusive use of all modifications which come within the scope of the appended claims is reserved.

The invention claimed is:

1. A method in a wireless communication system comprising at least one heterogeneous cell having a serving macro cell base station and at least one small cell subtended within a coverage area of the serving macro cell base station, the heterogeneous cell constituting a macro cell for subtended small cells, the method comprising:

providing in the macro cell at least one publicly-accessible small cell having a coverage area corresponding to a coverage area of the at least one small cell;

providing a first communication path between the at least one publicly-accessible small cell and a mobile terminal; and providing a second communication path between the serving macro cell base station and the mobile terminal, wherein forward link transmissions to the mobile terminal are performed over one of the first and the second communication paths and reverse link transmissions from the mobile terminal are performed over the other one of the first and the second communication paths based on a distance measured between the publicly-accessible small cell and the serving macro cell base station.

2. The method of claim 1 wherein the at least one publicly-accessible small cell operates to "guard" one or more restricted-access small cells against interference from power transmission from the mobile terminal or a macro or small cell base station.

3. The method of claim 1 wherein power transmission levels between the mobile station and a publicly-accessible small cell with which it is communicating are maintained at a comparable level to that which would be applied were the mobile terminal in communication with a nearby restricted-access cell.

4. The method of claim 1 wherein a publicly-accessible small cell deployed within the macro cell at a location subject to frequent handovers from cell to cell due to movement by an attached mobile terminal is provided with larger coverage area.

5. The method of claim 1 wherein ones of the at least one publicly-accessible small cell are established using remote radio head technology.

6. The method of claim 5 wherein the at least one publicly-accessible small cell is arranged as sectors of the serving macro cell base station.

7. The method of claim 1 wherein, for a publicly-accessible small cell deployed at or near a cell edge of a macro cell corresponding to the serving macro cell base station, the reverse link transmissions from the mobile terminal are performed over the first communication path and the forward link transmissions to the mobile terminal are performed over the second communication path.

8. The method of claim 1 wherein, for a publicly-accessible small cell deployed at a location closer to the serving macro cell base station than a cell edge of a macro cell corresponding to the serving macro cell base station, the reverse link transmissions from the mobile terminal are performed over the second communication path and the forward link transmissions to the mobile terminal are performed over the first communication path.

9. The method of claim 1 wherein, upon power-up of the mobile station in an area of overlapped coverage between the serving macro cell base station and the at least one publicly-accessible small cell, the mobile station camps on to the at least one publicly-accessible small cell.

10. The method of claim 9 wherein two or more publicly-accessible small cells deployed in a common geographical area are assigned identification indicia having a common group identification indicia and the group identification indicia is provisioned to the mobile terminal.

11. The method of claim 10 wherein the mobile terminal determines a publicly-accessible small cell to camp on based on the provisioned group identification indicia.

12. The method of claim 1 wherein the at least one small cell is implemented as a Home evolved Node B cell.

13. The method of claim 1 wherein the at least one small cell is implemented as a femto cell.

14. The method of claim 1 wherein the at least one small cell is implemented as a pico cell.

15. A wireless communication system including at least one heterogeneous cell having a serving macro cell base station and a plurality of small cells subtended within a coverage area of the serving macro cell base station, the heterogeneous cell constituting a macro cell for the plurality of subtended small cells, the wireless communication system comprising:

at least one publicly-accessible small cell having a coverage area corresponding to a coverage area of at least one small cell;

a first communication path between the at least one publicly-accessible small cell and a mobile terminal; and a second communication path between the serving macro cell base station and the mobile terminal, wherein forward link transmissions to the mobile terminal are performed over one of the first and the second communication paths and reverse link transmissions from the mobile terminal are performed over the other one of the first and the second communication paths based on a distance measured between the publicly-accessible small cell and the serving macro cell base station.

16. The wireless communication system of claim 15 wherein the at least one publicly-accessible small cell operates to "guard" one or more nearby restricted-access small cell against interference from power transmission from the mobile terminal or a macro or small cell base station.

17. The wireless communication system of claim 15 wherein ones of the at least one publicly-accessible small cell are established using remote radio head technology.

18. The wireless communication system of claim 17 wherein the at least one publicly-accessible small cell is arranged as sectors of the serving macro cell base station.

19. The wireless communication system of claim 15 wherein, for a publicly-accessible small cell deployed at or near a cell edge of a macro cell corresponding to the serving macro cell base station, the reverse link transmissions from the mobile terminal are performed over the first communication path and the forward link transmissions to the mobile terminal are performed over the second communication path.

20. The wireless communication system of claim 15 wherein, for a publicly-accessible small cell deployed at a location closer to the serving macro cell base station than a cell edge of a macro cell corresponding to the serving macro cell base station, the reverse link transmissions from the mobile terminal are performed over the second communication path and the forward link transmissions to the mobile terminal are performed over the first communication path.

* * * * *